United States Patent [19]

Randolph

[11] 4,294,807

[45] Oct. 13, 1981

[54] SYSTEM FOR REMOVING SOLIDS FROM A USED LIME OR LIMESTONE SLURRY SCRUBBING LIQUOR IN FLUE GAS DESULFURIZATION

[75] Inventor: Alan D. Randolph, Tuscon, Ariz.

[73] Assignees: Electric Power Research Institute, Inc., Palo Alto, Calif.; The Arizona Board of Regents, The University of Arizona, Tucson, Ariz.

[21] Appl. No.: 205,702

[22] Filed: Nov. 10, 1980

[51] Int. Cl.³ ............................................... B01D 9/02
[52] U.S. Cl. ..................................... 423/242; 23/301; 23/304
[58] Field of Search .................. 23/304, 301; 422/245; 423/242 A, 166

[56] References Cited

U.S. PATENT DOCUMENTS

| | | | |
|---|---|---|---|
| 3,873,532 | 3/1975 | Dahlstrom et al. | 423/242 A |
| 3,876,750 | 4/1975 | Hauser | 423/242 A |
| 4,150,096 | 4/1979 | Nelms et al. | 423/242 A |
| 4,213,946 | 7/1980 | Furuta et al. | 423/242 A |

*Primary Examiner*—Hiram Bernstein
*Attorney, Agent, or Firm*—Flehr, Hohbach, Test, Albritton & Herbert

[57] ABSTRACT

The flue gas desulfurization process using a lime or limestone slurry scrubbing solution producing used liquor containing calcium sulfite or sulfate (typically gypsum). Precipitated particles are removed by feeding the used scrubbing liquor to an agitated crystallization zone to grow crystals and directing part of the used scrubbing liquor from that zone to a quiescent crystallization zone, in which particles are settled back into the agitated zone. An underflow stream from the agitated zone containing large crystals is combined with an overflow stream from the quiescent zone, which combined stream is clarified with the fines being returned to the scrubber and the large crystals being removed as a waste product. Apparatus for performing the above process in which the agitated and quiescent crystallization zones form part of a single crystallization vessel, and the two zones are separated by a baffle.

11 Claims, 1 Drawing Figure

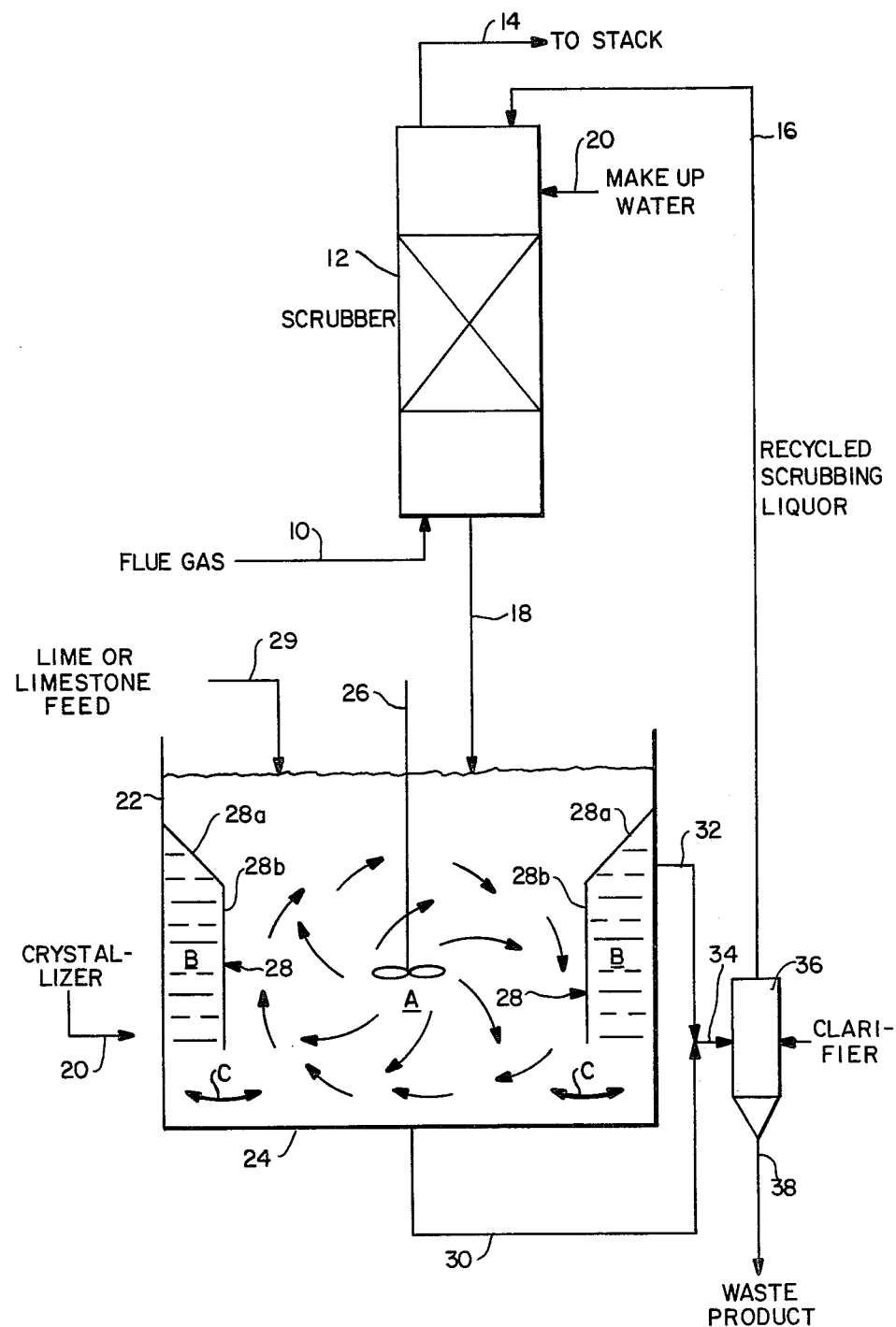

SYSTEM FOR REMOVING SOLIDS FROM A USED LIME OR LIMESTONE SLURRY SCRUBBING LIQUOR IN FLUE GAS DESULFURIZATION

Removal of sulfur dioxide from stack gases of coal fired power plants is particularly important in view of the strict environmental guidelines imposed by government agencies for sulfur content in such gases. One common flue gas desulfurization process which is being employed is a wet scrubber using either lime or limestone as the alkaline reactant. During this process, sulfur dioxide is absorbed by a slurry of lime or limestone, which reacts to form calcium sulfite or, if excess air is supplied, calcium sulfate. The sulfite/sulfate is precipitated as a fine solid and is disposed of as land-fill. The precipitate can be fully oxidized to produced gypsum ($CaSO_4.2H_2O$) crystals.

In a conventional lime or limestone system, the scrubbing liquid is replenished by adding fresh lime or limestone slurry in a holding tank to the used scrubbing liquor exiting from the scrubber. Replenished liquor from the holding tank is recycled to the scrubber, while a side stream is directed to a clarifier with the clarifier overflow being recycled to the holding tank, the clarifier underflow comprising waste product to be disposed of as land-fill or the like.

One of the problems with the above conventional system is that the solids which are formed are relatively small, requiring large clarifiers and filters to dewater the product sludge to a sufficient extent to provide an acceptable land-fill. It is currently thought that the small size of such particles is due to excessive nucleation caused by local zones of high supersaturation in the holding tank, which results in high-order primary nucleation mechanisms. A related problem with calcium sulfite is that the crystal habit is frequently lamellar or acicular and often highly twinned, giving the appearance of a snowflake, which causes additional dewatering problems. It would be highly advantageous to provide a system in which the particle size is increased and the crystal habit is changed to thereby aid filtration and improved the formation of a waste product acceptable as land-fill.

It is an object of the invention to provide a flue gas desulfurization process which produces a waste product of large particle size, especially suitable for use as land-fill.

It is a further object of the invention to provide such a waste product containing particles having an equant crystal habit.

It is another object of the invention to provide such a process in which dewatering of the waste product is facilitated.

It is a particular object of the invention to promote secondary nucleation by retaining large crystals from a used lime or limestone scrubbing liquor in a flue gas desulfurization process.

Further objects and features of the invention will be apparent from the following description taken in conjunction with the accompanying drawing.

In accordance with the above objects, a process is provided for increasing the crystal particle size of crystallizable waste product comprising calcium sulfite or sulfate, in hydrated or unhydrated form, from a gas desulfurization process using a lime or limestone slurry. In accordance with this technique, the used scrubbing liquor is fed to an agitated crystallization zone, wherein it is agitated to grow such crystals from the waste product. Part of the liquor from the agitated zone is directed to an inlet in the lower portion of a quiescent crystallization zone from which crystals are settled back into the agitated zone. The underflow stream from the agitated zone and an overflow stream of crystal-containing liquor from the upper part of the quiescent zone are separately removed from the vessel. For gypsum crystallization in this manner, secondary gypsum crystal nucleation is promoted, forming relatively large gypsum crystals of increased utility for land-fill. For calcium sulfite or calcium sulfite/sulfate hemihydrates, primary nucleation is decreased, forming larger cystals of increased utility for land-fill.

The FIGURE is a schematic representation of apparatus suitable for performing the process of the present invention.

Referring to the FIGURE flue gas containing sulfur dioxide from a source 10, such as a coal-fired power plant, is directed to the lower portion of a scrubber 12, and thereafter to the atmosphere through stack 14. Recycling scrubbing liquor passes into the upper portion of scrubber 12 through line 16 and contacts the flue gas countercurrently to form a used scrubbing liquor stream including crystallizable waste solids, and the stream is removed from the column in line 18. Makeup water is conventionally added as needed to the upper portion of the column through line 20. The above described system of flue gas desulfurization is well known. The present system is directed to the mode of treating the used scrubbing liquor from line 18 to form a waste product of large crystals having an equant habit which facilitates water removal from that waste product.

The waste solids to be crystallized according to the present invention include calcium sulfite or sulfate in hydrated or unhydrated form. While particularly adapted to removal of gypsum crystals, it is also applicable to calcium sulfite hemihydrate or to solid solutions of calcium sulfate in calcium sulfite hemihydrate, identified by the general formula $Ca(SO_3)_{1-x}(SO_4)_x \cdot \frac{1}{2}H_2O$. While, for simplicity of description, the present application will refer to crystallization of gypsum, the invention is generally applicable to the other compounds in the above group.

Referring again to the FIGURE, a crystallizer 20 is provided in the form of a cylindrical vessel with an upright cylindrical wall 22 and a horizontal circular bottom wall 24. Means is provided for agitating fluid in the central portion of crystallizer 20 in the form of a conventional rotary mixer 26. Used scrubbing liquor from line 18 and fresh lime or limestone feed from line 29 are added to the central or agitated portion of the vessel.

An important feature of crystallizer 20 is that it is divided into an agitated crystallization zone in the central area of the vessel exposed to mixer 26, and generally designated by the letter A, and a quiescent zone, generally designated by the letter B. In the illustrated embodiment, baffle means is provided in the form of a cord baffle 28 with an inverted frustoconical segment 28a mounted to the inner side of wall 22 and connected to the upper end of an upright, preferably vertical, cylindrical wall 28b, concentric with wall 22. Quiescent zone B is disposed in the area between baffle 28 and wall 22. A fluid flow passage designated by arrows C is provided at the lower portion of quiescent zone B to communicate with the adjacent lower portion of agitated zone A. As illustrated, passage C is provided by discontinuing the lower portion of wall 28b above crystallizer bottom wall 24. The liquor level in the FIGURE is maintained above baffle 28.

An underflow outlet means, including line 30, is provided in the lower portion of the agitated zone, preferably near the center of bottom wall 24. An overflow outlet means is provided in the upper portion of the quiescent zone, including overflow line 32, disposed preferably just below the top of baffle segment 28a in wall 22. In the illustrated embodiment, lines 30 and 32 are merged to form a common line 34, which is directed to a conventional clarifier 36. In the clarifier, particle sizes above and below a predetermined size are separated as by screening with the smaller particles being redirected as recycling scrubber liquor in line 16 to scrubber 12, and the larger particles being removed as a waste product stream from below the clarifier in line 38.

The above apparatus was developed with a view towards developing nucleation of gypsum crystals in crystallizer 20 by secondary mechanisms. In this manner, a substantial amount of relatively large crystals, including on the order of 20% or more of the crystals with a particle size in excess of 150 microns, typically in the range of 175-300 microns, are retained in the crystallizer. This is to be contrasted with conventional systems in which primary nucleation occurs, resulting in bursts of fine gypsum crystals which are difficult to dewater and which yield an ultimate particle size below a desirable level for use as land-fill or the like.

Unexpectedly, it has been discovered that by the use of adjacent agitated and quiescent zones as illustrated above, and by removing the scrubbing liquor in two different overflow and underflow streams from such zones, stable secondary nucleation is accomplished. The process conditions are adjusted to assure retention of the larger crystal in the system for a substantial period of time, which promotes growth of additional large crystals. Thus, the conditions are adjusted so that the large crystals which grow in agitated zone A and move through passageway C into quiescent zone B are of sufficient size to continuously fall back into agitated zone A rather than pass out overflow line 32. For example, overflow line 32 includes no substantial amount of crystals with a particle size greater than 150 microns. This assures a constant community of large crystals in the agitated zone, which promotes the growth of additional quantities of such large crystals.

One way to assure that the larger crystals have a relatively large residence time in the system is to provide a substantially larger overflow stream including essentially no large crystals (e.g., greater than 150 microns) in comparison to the underflow stream. Thus, for example, it has been found preferable to have a volume ratio of overflow to underflow streams in the range of from about 3:1 to about 10:1.

For economy, it is preferable, but not essential, to combine the overflow and underflow streams into a single stream 34 prior to size separation in clarifier 36. There, the streams are separated into a fines stream, with crystal sizes below a predetermined size, and a waste product stream, with crystal sizes above that predetermined size. The fines stream is redirected in line 16 to the flue gas scrubber 12 for use as scrubbing liquor. A suitable predetermined size is about 10 to 20 microns, and preferably on the order of 15 microns.

Another feature of the invention is the addition of the citric acid reagent to promote crystal growth in a good, i.e. equant, crystal habit. Suitable concentrations of citric acid are about from 0.1 to 1.0 g/l based upon the total liquid in crystallizer 20. By forming an equant, or relatively rounded, habit in comparison to a needle-like habit, crystals settle in the crystallizer with a smaller size cut and faster velocity for a given baffle, thereby minimizing the baffle area and maximizing the crystal area.

The ratio of the volume of the quiescent zone to that of the agitated zone is dependent mainly upon the ease of settling crystals back into the agitated zone. Such settling typically occurs in the Stokes Law region of particle settling. Most of the crystal growth occurs in the agitated zone rather than the quiescent zone. It is preferable to limit the quiescent zone to that required for settling purposes to maintain the desired concentration of large crystals in the agitated zone.

The ratio of the lime or limestone feed 29 to the used scrubbing liquor 18 added to crystallizer 20 is a function of the conditions maintained in the scrubber, as is well recognized. Typically lime or limestone is added to the agitated tank to maintained the pH at some reference ratio, e.g. pH of 5-6. The amount of lime or limestone addition, of course, then depends on the flow and acid concentration of the pregnant scrubber liquor.

The preferred system for controlling the predominance of secondary nucleation mechanisms is by use of the above described baffled vessel. It should be understood that other, more complex systems could be used, such as external screens, wet screens, or external hydroclones, but that this would be more expensive and less preferred.

Comparative experiments have been run illustrating the significance of the use of a quiescent zone in combination with an agitated zone to facilitate large crystal growth. In one such experiment the system of the FIGURE was simulated with the exception that no scrubber is used and so stream 16 is recycled directly to crystallizer 20 rather than being directed to a scrubber. This is designated as System 1. By way of comparison, a similar system was utilized with a mixed suspension in a vessel and a single product outlet stream without recycle (designated Comparative System 1). A third system was compared as well, including a single outlet and a clarifier with returned recycled fines, but with no internal baffle (designated Comparative System 2). System 1 had a mean (mass weight) size of about 83 to 130 microns. In contrast, Comparative System 1 had a mean size of 71 microns, while Comparative System 2 had a mean size of 67 microns.

In order to more clearly disclose the nature of the present invention, specific examples of the practice thereof are set forth below. It should be understood, that this is done by way of example and is intended neither to delineate the scope nor limit the appended claims.

EXAMPLE 1

This example illustrates a simulated experiment using the design of System 1 described above for improvement of gypsum crystal size. The following composition is used as the feed solution which is representative of a completely oxidized scrubber liquor.

| COMPOSITION | | | |
|---|---|---|---|
| Ionic Concentration | | Salt Concentration | |
| Ion | Concentration, g/l | Salt | Concentration, g/l |
| CA++ | 1.79 | CaSO$_4$ . 2H$_2$O | 1.80 |
| Mg++ | 0.20 | CaCl | 3.80 |
| Na+ | 0.05 | MgSO$_4$ | 0.99 |
| SO$_4$= | 1.79 | NaCl | 0.13 |
| Cl− | 2.51 | | |

The mixed crystallizing vessel is of about 20,000 gal. capacity. The mixed slurry underflow is 25 gpm. An internal chord baffle is provided to classify particles in the overflow at a mean cut size of about 50 μm with essentially no particles greater than 80 μm in size. This classifier overflow flow rate is maintained at 100 gpm. Both mixed underflow and classified overflow are mixed together and are directed to an external settler/clarifier which has a mean classification size of 15 μm. Particles in the overflow from the settler/clarifier (less than 15 μm in size) are returned in the overflow to the scrubber vessel. Pregnant scrubber liquor is fed to the mixed tank together with Ca(OH)$_2$ and air to oxidize the sulfite to the gypsum form, (CaSO$_4$.2H$_2$O). The scrubber is operated to extract about 6 T/D (gypsum basis) of sulfur oxides from the flue gas. Under these conditions a mean particle size of at least about 140 μm is produced in the crystallizer, and the mean particle size in the underflow product from the settler/clarifier is at least about 100 μm.

EXAMPLE 2

A 20,000 gal. mixed crystallizer body similar to that of Example 1 is used. Also, the same feed as in Example 1 is employed with a mixed underflow of 25 gpm. The settling baffle is adjusted to provide a mean classification cut point of 70 μm, with a settler overflow of 150 gpm. Pregnant scrubber liquor giving a net gypsum production rate of 6 T/D is fed to the mixed tank. The scrubber consists of a slotted plate column of approximately 5,000 gal. holdup picked with neutrally bouyant two inch polymeric balls to minimize fouling. The scrubber processes approximately 25 ASCF of flue gas to yield the 6 T/D of gypsum. The settler/clarifier again operates with a mean classification cut size of 15 μm. Air and limestone are fed to the mixed tank to produce the gypsum crystal form. Under these conditions the average particle size in the mixed tank is at least about 170 μm with a settler/clarifier underflow product mean size of at least about 110 μm.

What is claimed is:

1. In a flue gas desulfurization process using a lime or limestone slurry scrubbing liquor in which used liquor including crystallizable solids comprising calcium sulfite or sulfate, in hydrated or unhydrated form, is produced, wherein precipitated particles are removed from the used scrubbing liquor, the steps of
   (a) feeding the used scrubbing liquor to an agitated crystallization zone and agitating the liquor therein, thereby growing crystals from said crystallizable solids,
   (b) directing part of the used scrubbing liquor from the agitated crystallization zone to an inlet in the lower portion of a quiescent crystallization zone, and settling said crystals therein back into the agitated crystallization zone,
   (c) removing an underflow stream of crystal-containing liquor from the agitated crystallization zone and separate overflow stream of crystal-containing liquor from an upper part of the quiescent crystallization zone, the ratio of said underflow stream to said overflow stream being adjusted to cause crystals above a predetermined size to settle from the quiescent zone back into said agitated zone, rather than being carried out in the overflow stream, to promote secondary crystal nucleation.

2. The process of claim 1 in which the agitated and quiescent crystallization zones are disposed in the same vessel, the agitated zone being centrally disposed and separated from the quiescent zone by upright baffle means with scrubbing liquor flow between said zones through a passage at the lower portion of the baffle means.

3. The method of claim 1 in which at least 20% by weight of the crystals removed in the underflow have a particle size greater than 150 microns.

4. The method of claim 3 in which no substantial amount of crystals with a particle size greater than 150 microns are removed in the overflow.

5. The method of claim 1 in which the ratio of the overflow stream to the underflow stream is in a range from about 3:1 to about 10:1.

6. The method of claim 1 in which the overflow and underflow streams are first combined and then separated into a fines stream, with crystal particles below a predetermined size, and a waste product stream, with crystal particles above said predetermined size, and then said combined fines stream is directed to a flue gas scrubber for use as scrubbing liquor.

7. The method of claim 6 in which said predetermined size is about 10 to 20 microns.

8. The method of claim 1 in which a quantity of citric acid is maintained in said agitated and quiescent crystallization zones to promote crystal growth in an equant crystal habit.

9. The method of claim 1 in which said crystallizable solids comprise gypsum.

10. Apparatus suitable for removing large crystal particles from a crystal-containing used liquor formed by flue gas desulfurization with a lime or limestone slurry scrubbing liquor, said apparatus comprising
    (a) a flue gas scrubber,
    (b) crystallization chamber means defining an agitated crystallization zone and an adjacent quiescent crystallization zone separated by upright baffle means which defines a fluid flow passage at the lower portion of said quiescent crystallization zone,
    (c) conduit means for directing used scrubbing liquor from said flue gas scrubber to said agitated mixing zone,
    (d) means for mixing fluid in said agitated mixing zone,
    (e) fluid overflow outlet means in the upper part of said quiescent crystallization zone,
    (f) fluid underflow outlet means in the lower part of said quiescent crystallization zone,
    (g) means for separating fluid from said underflow outlet means and overflow outlet means into a fines stream, with crystals below a predetermined size, and a product stream, with crystals above said predetermined size, and
    (h) a recycle line for directing said fines stream back to said flue gas scrubber.

11. The apparatus of claim 10 in which said crystallization chamber means is an upright cylindrical vessel and said baffle means defines said agitated crystallization zone as a centrally disposed cylindrical shape and said quiescent column as an outer upstanding annular column.

* * * * *